April 5, 1949. J. N. WOLFRAM 2,466,526
COUPLING FOR TUBES
Filed April 8, 1944 2 Sheets-Sheet 2
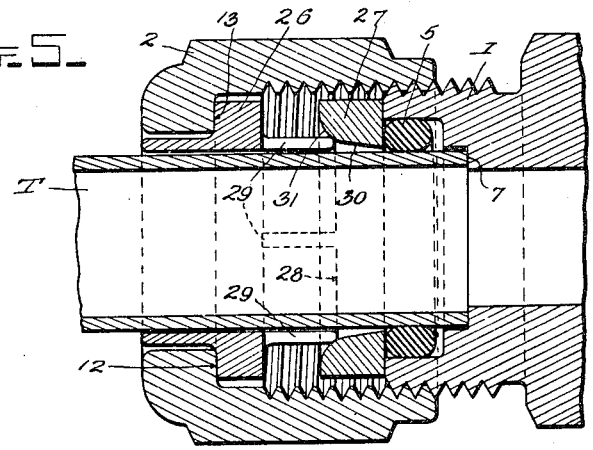
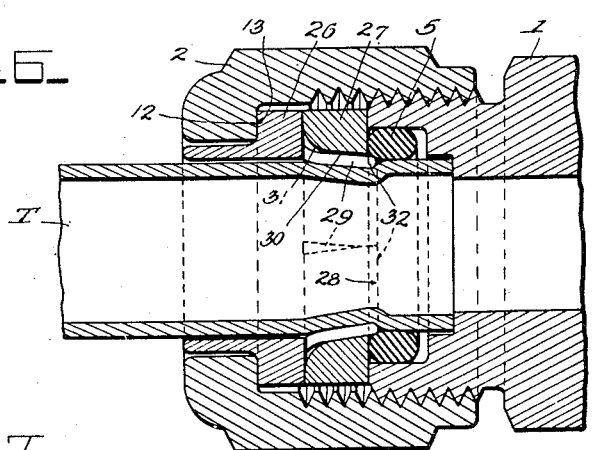
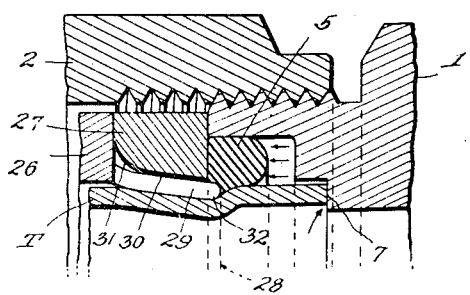
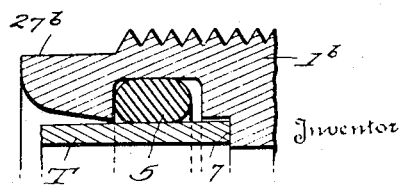
Inventor
John N. Wolfram
By Mason, Porter & Diller
Attorneys Patented Apr. 5, 1949

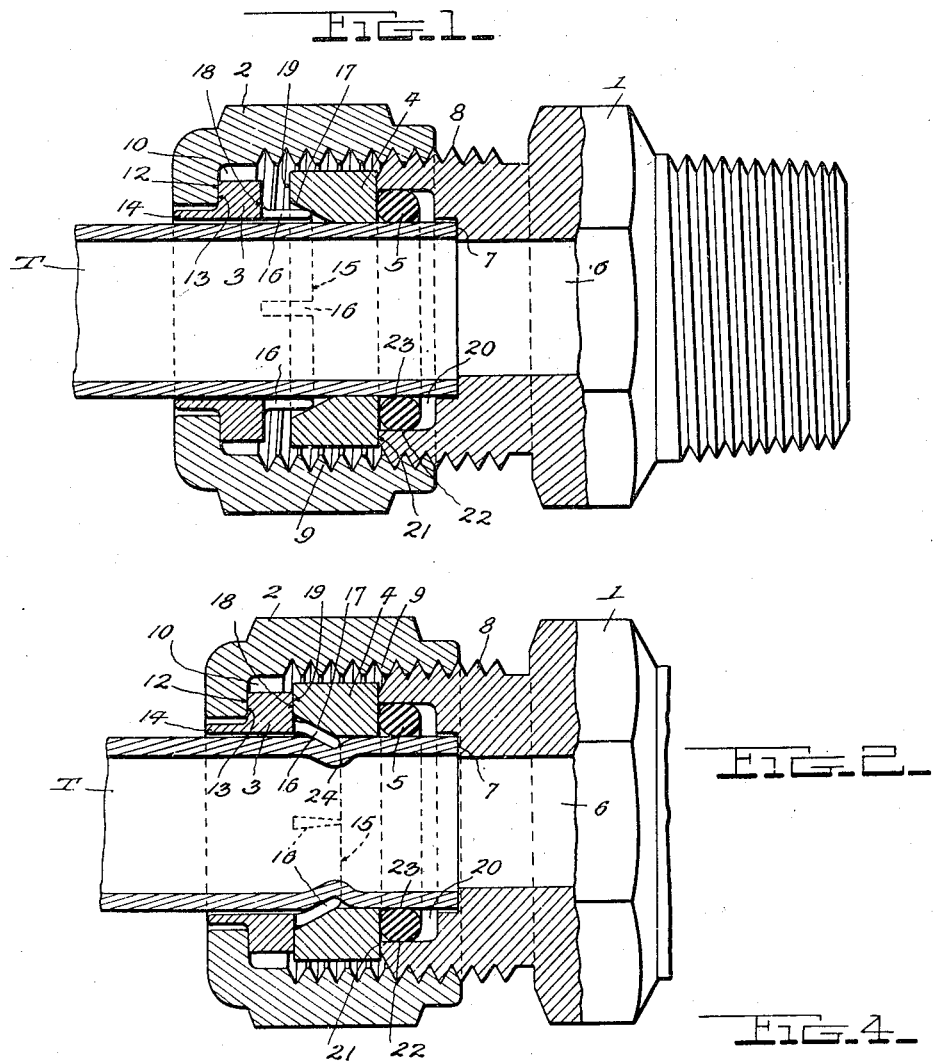

2,466,526

UNITED STATES PATENT OFFICE 2,466,526

COUPLING FOR TUBES

John N. Wolfram, Cleveland, Ohio, assignor to The Parker Appliance Company, Cleveland, Ohio, a corporation of Ohio Application April 8, 1944, Serial No. 530,176

9 Claims. (Cl. 285—86)

The invention relates to new and useful improvements for couplings in tubes and more particularly a coupling which is adapted to securely hold and seal a flareless tube.

An object of the invention is to provide a coupling of the above type wherein means is provided for mechanically gripping the tube when the coupling is closed for holding the same from endwise movement in the coupling, and wherein means is also provided for a gasket which makes sealing contact with the coupling and the tube between the mechanical gripping means and the end of the tube.

A further object of the invention is to provide a coupling of the above character wherein the gasket is so disposed that fluid pressure on the tube and coupling will contact with the gasket and force the same into tighter sealing contact with the coupling and the tube.

A still further object of the invention is to provide a coupling of the above type wherein the tube is gripped by contracting the inner end portion of a sleeve and wherein said inner end portion of the sleeve is provided with slots at spaced intervals to facilitate the contraction of the gripping end.

Another object of the invention is to provide a coupling of the above type wherein the sleeve is contracted by a collet which surrounds the tube, which collet also serves as an abutment for the sealing gasket when fluid pressure contacts with the gasket so that the gasket is deformed into tight sealing contact with the coupling member, the tube and the abutment on the collet.

These and other objects will in part be obvious and will in part hereinafter be more fully disclosed.

In the drawings,

Figure 1 is a longitudinal sectional view through a coupling embodying the improvements with the parts in their initially assembled position;

Figure 2 is a view similar to Figure 1 but showing the coupling closed and the tube gripped so as to prevent endwise movement thereof in the coupling;

Figure 3 is a view showing in detail a section of the coupling and indicating the maner in which the fluid pressure operates upon the gasket for increasing the tightness of the seal;

Figure 4 is a longitudinal sectional view through a portion of the coupling showing a modified form of construction wherein the collet and the body member are integrally formed;

Figure 5 is a view similar to Figure 1 but showing a slightly modified form of gripping sleeve wherein the gripping portion of the sleeve extends all the way through the collet and is contacted with by the sealing gasket;

Figure 6 is a view similar to Figure 5 but showing the coupling closed and the tube firmly gripped and held against endwise movement therein;

Figure 7 is a view of a portion of the coupling with the parts in closed position and indicating the manner in which the fluid pressure operates upon the gasket for increasing the tightness of the seal; and Figure 8 is a view in longitudinal section showing a slightly modified form of construction wherein the collet and body member of Figure 7 are integrally formed.

The invention has to do with a coupling for tubes and more particularly a tube which is of uniform diameter all the way to the end thereof. In other words, the coupling is adapted to grip and hold the tube which has not been flared or otherwise deformed before insertion in the coupling. The coupling as shown in Figures 1 and 2, includes a body member 1, a nut 2, a clamping sleeve 3, a collet 4 which operates upon the clamping sleeve for contracting the same for the gripping of the tube T, and a sealing gasket 5 which is disposed between the mechanical clamping devices, that is, the sleeve and collet, and the inner end of the tube.

The body member 1 is provided with means of the usual character whereby it may be attached to some part to which the tube is to be connected. There is a bore 6 through the body member which is of substantially the bore of the tube which is to be clamped. This body member is counterbored at 7 to form a seat for the end of the tube. This is a positioning seat which locates the tube when it is put in the coupling and centers it relative to the coupling. The body member 1 is also provided with a threaded portion 8 adapted to be engaged by a threaded portion 9 on the nut 2.

The nut is provided with a recess 10 in which is located the clamping sleeve 3. The nut has an inwardly extending part providing a shoulder 12 which is adapted to engage a shoulder 13 on the sleeve. The sleeve may also be provided with a portion 14 which extends along the tube and between the inwardly projecting part of the nut and the tube. The sleeve at the inner side thereof is reduced in thickness so as to provide a clamping section 15 which may be contracted into engagement with the tube. This clamping section is slotted at intervals as indicated at 16 to facilitate the contraction of the inner end of the clamping section.

The collet 4 is preferably a solid ring section having a tapered recess 17 at its outer end which tapered section is adapted to be forced onto the contractible portion of the sleeve for contracting it into engagement with the tube. The sleeve has an inner shoulder 18 and the collet has an end shoulder 19 which, when the coupling is closed, contacts with the shoulder on the sleeve.

The body member 1 is provided with a recess 20 in which the gasket 5 is placed. The end of the body member 21 forms an abutment seat for the collet 4.

The gasket 5 is so dimensioned relative to the recess 20 that when placed in the recess it will be deformed into oval shape and make a tight line sealing contact with the body member, as indicated at 22. It is also dimensioned relative to the tube so that when the tube is inserted through the gasket, the gasket will be impinged upon by the tube and make a tight line sealing contact therewith, as indicated at 23. This seal between the gasket, the tube and the body member is accomplished before the coupling is closed. When the nut is turned onto the body member a collet will be forced onto the contractible clamping portion of the sleeve and this will contract said portion and cause the tube to be slightly deformed inwardly, as indicated at 24. The end of the clamping portion will thus be forced into gripping contact with the tube and will hold the tube positively against any endwise movement in the coupling members. When the shoulder 19 of the collet contacts with the shoulder 18 of the sleeve, no further movement of the collet on the sleeve is permitted and this will limit the extent to which the clamping portion of the sleeve is contracted and also limit the deforming of the tube. It is noted that the slots 16 are of a width so that the inner end of the slot is substantially closed when the sleeve is contracted into gripping engagement with the tube. This will provide a substantially continuous gripping line contact between the sleeve and the tube all the way around the tube.

When fluid pressure is placed on the line, the fluid will pass between the end of the tube and the seat, which is not a sealing seat, and will contact with the gasket, as indicated in Figure 3. This fluid pressure on the gasket will deform the gasket and force it into tight sealing contact, not only with the tube, as indicated at 23, but also with the body member indicated at 22 and with the collet, as indicated at 25. This makes a coupling which is adapted to very firmly grip a flareless tube by mechanical means which deforms the tube inwardly slightly so as to provide a mechanical grip with the tube. The sealing gasket functions entirely independently of the closing of the coupling members and it is disposed between the mechanical gripping devices and the end of the tube. Initially the gasket makes a good seal for the coupling, but when fluid pressure is introduced into the system, the tightness of the seal will be greatly increased by the fluid pressure and the greater the fluid pressure, the tighter the seal.

In Figure 4 there is shown a slightly modified form of construction wherein the body member, indicated at 1ᵃ and the collet for contracting the sleeve, indicated at 4ᵃ, are integrally formed with the body member. The tube T engages a seat 7 in the manner described above. The gasket 5 is placed in a recess 20ᵃ in the body member and functions precisely as described above.

In Figures 5 to 7 inclusive there is shown a coupling wherein the sleeve and collet for contracting the same are of a slightly different form. Otherwise the coupling is similar to that which has been described above. The coupling consists of a body member 1, a nut 2, a sleeve 26, a collet 27, and a gasket 5. The tube, indicated at T, engages a positioning seat 7 in the body member 1. The sleeve 26 has a shoulder 13 which cooperates with a shoulder 12 on the nut. The sleeve at the inner end thereof is reduced in diameter so as to provide a clamping portion 28 which may be contracted into engagement with the tube in the manner described in connection with Figures 1 and 2. The sleeve is provided with slots 29 to facilitate the contraction of the same. The collet 27 has a tapered inner face 30 which extends all the way to the inner side of the collet and at its outer side it is curved outwardly so as to provide a camming shoulder 31 for contracting the sleeve when said collet is forced onto the sleeve. This portion of the sleeve which is to be contracted is of greater length than the contractible portion of the sleeve shown in Figure 1 and when the coupling is closed, as shown in Figure 6, then the extreme inner end of the contractible section, indicated at 32, is disposed slightly within the inner limits of the collet 27 so that the gasket 5 will engage not only the tube and the body member of the coupling and the collet, but also the inner end of the sleeve. It is noted that the slots 29, when the sleeve is contracted, are closed up so that there is a continuous line contact between the end 32 of the sleeve and the gasket. The coupling described is particularly adapted for use in connection with high pressure lines. When fluid pressure is placed on the line after the coupling is closed, the fluid will pass between the end of the tube T and the seat 7 on the body member into the recess containing the gasket 5 and will deform the gasket, as indicated in Figure 7. The gasket will be forced into tight contact with the body member, into tight contact with the tube, into tight contact with the collet, and also into tight contact with the inner end of the gripping sleeve.

In Figure 8 there is shown a slightly modified form of construction wherein the body member 1ᵇ and the collet 27ᵇ are integrally formed. Otherwise the structure is the same as that shown in Figures 5 and 7 and further detailed description thereof will not be necessary.

It will be noted that the tube is clamped by contracting the sleeve and the contraction of the sleeve is accomplished by the collet which is forced onto the sleeve when the coupling is closed. The body member and the nut can therefore be made of aluminum alloy or other light-weight material, while the collet and sleeve are preferably of harder and tougher material, such as steel so as to effect deformation of a stainless steel tube and thereby establish a firm grip on the tube to resist mechanical pull-out strains and pull-out strains introduced by high pressure within the tube.

Some of the advantages which are apparent from the structure described above may be summarized as follows:

The fluid seal is entirely independent of the grip on the tube for holding it in the coupling. The pressure on the tube line acts on the entire annular area of the recess for the gasket and the effectiveness of the seal is increased as the pressure increases. The packing recess for the sealing gasket is of fixed size and proportion and the tightening of the nut and the gasket is not in any way effected by the torque used in the tightening of the nut. The positive limit of contraction of the sleeve by the collet contacting with the sleeve prevents excessive deformation of the tube and also positively prevents the cam ring or collet from moving away from the body member of the coupling. The ends of the sleeve which grip the tube are rounded and this prevents cutting into the tube.

These and other advantages will be apparent without further reference thereto.

It is essential, however, that the coupling shall be provided with mechanical gripping devices which will deform the flareless tube so as to provide a firm gripping engagement therewith which will positively hold the tube from endwise movement in the coupling and it is also essential that a sealing gasket shall be provided which is disposed between the mechanical means for holding the tube and the end of the tube which sealing gasket is contacted with by fluid pressure on the line for tightening the contact of the gasket with the tube and the coupling parts.

It is obvious that many changes other than those illustrated may be made in the coupling without departing from the spirit of the invention as set forth in the appended claims.

I claim:

1. A coupling for tubes comprising a body member having a seat for positioning the tube in the coupling, a nut having threaded engagement with said body member, a sleeve disposed within said nut and moved endwise thereby, said sleeve having the inner end portion thereof constructed so that it may be contracted into gripping contact with the tube, a collet disposed between the sleeve and the body member and having a cam face for engaging the sleeve for contracting the inner end thereof, said body member having a recess disposed between said collet and the seat therein, a sealing gasket disposed in said recess and adapted to make sealing contact with the body member and the tube.

2. A coupling for tubes comprising a body member having a seat for positioning the tube in the coupling, a nut having threaded engagement with said body member and having an inwardly extending part at the outer end thereof, a clamping sleeve disposed within the nut and having a shoulder adapted to be engaged by the nut whereby the sleeve is forced endwise with the tube by the turning of the nut onto the body member, said sleeve having the inner end portion thereof constructed so that it may be contracted into gripping engagement with the tube and the tube deformed so as to provide a firm positive engagement of the sleeve with the tube, said sleeve being provided with longitudinal slots at spaced intervals to facilitate the contraction of the gripping portion of the sleeve, a collet disposed within said nut and adapted to bear against the end of the body member, said collet having a tapered inner surface adapted to be engaged by the contractible portion of the sleeve for the contracting of the same and said sleeve having a shoulder adapted to contact with the collet for limiting the movement of the sleeve relative to the collet and the deforming of the tube by the contracting of the sleeve.

3. A coupling for tubes comprising a body member having a seat for positioning the tube in the coupling, a nut having threaded engagement with said body member and having an inwardly extending part at the outer end thereof, a clamping sleeve disposed within the nut and having a shoulder adapted to be engaged by the nut whereby the sleeve is forced endwise of the tube by the turning of the nut onto the body member, said sleeve having the inner end portion thereof constructed so that it may be contracted into gripping engagement with the tube and the tube deformed so as to provide a firm positive engagement of the sleeve with the tube, said sleeve being provided with longitudinal slots at spaced intervals to facilitate the contraction of the gripping portion of the sleeve, a collet disposed within said nut and adapted to bear against the end of the body member, said collet having a tapered inner surface adapted to be engaged by the contractible portion of the sleeve for the contracting of the same and said sleeve having a shoulder adapted to contact with the collet for limiting the movement of the sleeve relative to the collet and the deforming of the tube by the contracting of the sleeve, said body member having a recess closed by the collet, a gasket disposed in said recess and adapted to initially make sealing contact with the body member and the tube.

4. A coupling for tubes comprising a body member having a seat for positioning a tube in the coupling, a nut having threaded engagement with said body member, a metal sleeve disposed within said nut and having the inner end portion thereof shaped to provide devices adapted to be contracted into gripping engagement with the tube, means cooperating with said sleeve for contracting the inner end thereof, said body member having a recess disposed between said means for contracting the sleeve and the seat in the body member, said gripping devices being extended through said contracting means and serving with said contracting means for closing said recess, a deformable sealing gasket disposed in said recess and adapted to make sealing contact with the body member, the tube, the inner face of the contracting means and the inner ends of the gripping devices.

5. A coupling for tubes comprising a body member having a seat for positioning a tube in a coupling, a nut having threaded engagement with said body member, a metal sleeve disposed within the nut and having the inner end portion thereof shaped to provide gripping devices for gripping the tube for holding the same in the coupling, a collet disposed between the sleeve and the body member and adapted to contract the gripping devices into engagement with the tube, said body member having a recess disposed between the collet and the seat in the body member, said gripping devices being extended through the collet to the inner face thereof, said collet and gripping devices serving to close said recess, a deformable sealing gasket disposed in said recess and adapted to make sealing contact with the body member, the tube, the inner face of the collet and the inner ends of said gripping devices.

6. A coupling for tubes comprising a body member having a bore adapted to receive the tube end and an annular gasket recess surrounding the tube, a nut having a thread engagement with said body member, metallic gripping means disposed within the coupling for gripping the tube when the nut is turned onto the body member for securing the tube to the body member, a deformable resilient sealing gasket disposed in said annular recess, said gasket being initially of greater transverse diameter than the distance between the tube and the opposed wall of the recess so 7. A coupling for tubes comprising a body member having a bore adapted to receive the tube end and an annular gasket recess surrounding the tube, a nut having a thread engagement with said body member, metallic gripping means disposed within the coupling for gripping the tube when the nut is turned onto the body member for securing the tube to the body member, a deformable resilient sealing gasket disposed in said annular recess, the inner diameter of said gasket being initially of slightly less diameter than the outer diameter of the tube and the outer diameter of the gasket being slightly greater than the diameter of the recess so that when the gasket is placed on the tube it will of its own expanding force make tight sealing contact with the tube and when forced into the recess it will make tight sealing contact with the body member.

8. A coupling for tubes comprising a body member having a bore adapted to receive the tube end and an annular gasket recess surrounding the tube, a nut having a thread engagement with said body member, metallic gripping means disposed within the coupling for gripping the tube when the nut is turned onto the body member for securing the tube to the body member, a deformable resilient sealing gasket disposed in said annular recess, said gasket being initially of greater transverse diameter than the distance between the tube and the opposed wall of the recess so that when the gasket is deformed into said recess, it will of its own expanding force make tight sealing contact with the body member and the tube, said gripping means including means for closing the end of the recess in the body member whereby fluid escaping from the tube into the recess will press the gasket against said closing means and expand the gasket into tighter sealing contact with the tube and the body wall.

9. A coupling for tubes comprising a body member having a bore adapted to receive the tube end and an annular gasket recess surrounding the tube, a nut having a thread engagement with said body member, metallic gripping means disposed within the coupling for gripping the tube when the nut is turned onto the body member for securing the tube to the body member, a deformable resilient sealing gasket disposed in said annular recess, said gasket being free from pressure by the turning of the nut onto the body member for the gripping of the tube and operating by its own expanding force to make tight sealing contact with the body member and the tube.

JOHN N. WOLFRAM.

REFERENCES CITED

The following references are of record in the file of this patent:

UNITED STATES PATENTS

| Number | Name | Date |
|---|---|---|
| 2,021,745 | Pfefferle et al. | Nov. 19, 1935 |
| 2,219,053 | Osborn | Oct. 22, 1940 |
| 2,232,513 | Confer | Feb. 18, 1941 |
| 2,333,470 | Cowles | Nov. 2, 1943 |
| 2,343,922 | Parker | Mar. 14, 1944 |
| 2,405,822 | Franck | Aug. 13, 1946 |

FOREIGN PATENTS

| Number | Country | Date |
|---|---|---|
| 379,413 | Great Britain | Sept. 1, 1932 |
| 388,859 | Great Britain | Mar. 9, 1933 |
| 485,154 | Great Britain | May 16, 1938 |
| 98,001 | Sweden | Feb. 6, 1940 |